(12) United States Patent
Goergen et al.

(10) Patent No.: US 10,252,460 B1
(45) Date of Patent: Apr. 9, 2019

(54) METHOD OF FORMING AN OPTICAL ELEMENT USING AN ADDITIVE MANUFACTURED COMPONENT, AND RELATED DEVICES, COMPONENTS, AND SYSTEMS

(71) Applicant: Lockheed Martin Corporation, Bethesda, MD (US)

(72) Inventors: Patrick J. Goergen, Orlando, FL (US); Gregory A. Harrison, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 227 days.

(21) Appl. No.: 14/854,176

(22) Filed: Sep. 15, 2015

Related U.S. Application Data

(60) Provisional application No. 62/050,551, filed on Sep. 15, 2014.

(51) Int. Cl.
*B29C 51/10* (2006.01)
*B29C 33/38* (2006.01)
(Continued)

(52) U.S. Cl.
CPC ............ *B29C 51/36* (2013.01); *B22F 3/1055* (2013.01); *B28B 1/001* (2013.01);
(Continued)

(58) Field of Classification Search
CPC .......................... B29C 33/3814; B29C 51/10
See application file for complete search history.

(56) References Cited

U.S. PATENT DOCUMENTS

| 5,173,552 A * | 12/1992 | Renzi .................... C08F 218/00 264/2.7 |
| 6,919,037 B2 * | 7/2005 | Ortiz ................. B29C 45/14811 264/1.9 |

(Continued)

FOREIGN PATENT DOCUMENTS

| EP | 0204083 A2 | 12/1986 |
| JP | 2010153113 A * | 7/2010 |

OTHER PUBLICATIONS

Hydrosight, "Acrylic Vs. Polycarbonate: A Quantitative and Qualitative Comparison", http://www.hydrosight.com/acrylic-vs-polycarbonate-a-quantitative-and-qualitative-comparison/, wayback machine date, Nov. 3, 2013, 2 pages.*

(Continued)

*Primary Examiner* — Lisa L Herring
(74) *Attorney, Agent, or Firm* — Withrow & Terranova, PLLC

(57) ABSTRACT

Methods of forming an optical element, and related devices, components, and systems are disclosed. One method comprises printing a mold element comprising at least one mold surface using an additive manufactured device. The method further comprises providing a plastic sheet over the mold element. The method further comprises vacuum thermoforming the plastic sheet such that at least a first portion of the plastic sheet conforms to the at least one mold surface of the mold element. This vacuum thermoforming of the plastic sheet forms an optical element from at least a second portion of the plastic sheet. One advantage of this method is that different optical elements may be quickly and inexpensively fabricated, thereby reducing the cost of development and production of the optical elements.

18 Claims, 4 Drawing Sheets

(51) Int. Cl.
  *B29C 51/26* (2006.01)
  *B29C 51/36* (2006.01)
  *B33Y 10/00* (2015.01)
  *B33Y 50/02* (2015.01)
  *B33Y 80/00* (2015.01)
  *B22F 3/105* (2006.01)
  *B28B 1/00* (2006.01)
  *B29L 11/00* (2006.01)
  *B29K 101/12* (2006.01)
  *B29K 105/00* (2006.01)

(52) U.S. Cl.
  CPC .......... *B29C 33/3842* (2013.01); *B29C 51/10* (2013.01); *B29C 51/266* (2013.01); *B29K 2101/12* (2013.01); *B29K 2105/256* (2013.01); *B29L 2011/00* (2013.01); *B33Y 10/00* (2014.12); *B33Y 50/02* (2014.12); *B33Y 80/00* (2014.12)

(56) References Cited

U.S. PATENT DOCUMENTS

| | | | |
|---|---|---|---|
| 8,378,045 B2 | 2/2013 | Kaarto et al. | |
| 8,625,200 B2 | 1/2014 | Smith et al. | |
| 8,781,794 B2 | 7/2014 | Harrison et al. | |
| 2008/0093753 A1* | 4/2008 | Schuetz | B29C 33/3814 264/1.9 |
| 2008/0100938 A1* | 5/2008 | Englander | B60R 1/08 359/868 |
| 2010/0155975 A1* | 6/2010 | Heinrich | B29C 33/3814 264/1.38 |
| 2011/0205626 A1* | 8/2011 | Saylor | G02B 27/26 359/465 |
| 2012/0123742 A1 | 5/2012 | Harrison et al. | |
| 2012/0250344 A1* | 10/2012 | Koshiba | F21S 48/1208 362/540 |
| 2013/0069282 A1* | 3/2013 | Abe | B29C 33/3842 264/328.1 |
| 2015/0054930 A1* | 2/2015 | Bangera | G06K 9/00134 348/77 |
| 2015/0132532 A1* | 5/2015 | Preisler | B32B 27/065 428/85 |
| 2017/0053438 A1* | 2/2017 | Huang | G06T 17/20 |
| 2017/0235161 A1* | 8/2017 | Hilkes | G02C 13/005 351/204 |

OTHER PUBLICATIONS

JP2010153113A Google Patents Translation Performed on Feb. 20, 2018. (Year: 2018).*

"Manufacturing—Tooling Solutions Thermoforming", https://proto3000.com/manufacturing-tooling-solutions-thermoforming.php, per Waybackmachine, Jul. 2004, 2 pages. (Year: 2004).*

Talk Packaging, "Thermoforming", http://www.talkpkg.com/Learning-Center/Mat-Tech/Misc/Thermoformed.htm, per Waybackmachine, Sep. 2013, 13 pages. (Year: 2013).*

Frick, "How to Smooth 3D-Printed Parts", http://www.machinedesign.com/3d-printing/how-smooth-3d-printed-parts, Apr. 2014, 6 pages. (Year: 2014).*

"How I Built a Vacuum Forming Rig", http://www.mdpub.com/vacuumformer/index.html, per Wayback machine, Jul. 2014, 8 pages. (Year: 2014).*

* cited by examiner

METHOD OF FORMING AN OPTICAL ELEMENT USING AN ADDITIVE MANUFACTURED COMPONENT, AND RELATED DEVICES, COMPONENTS, AND SYSTEMS

RELATED APPLICATIONS

This application claims the benefit of provisional patent application Ser. No. 62/050,551, filed on Sep. 15, 2014, entitled "MECHANISMS FOR MAKING A NON-ROTATIONALLY SYMMETRIC OPTICAL SURFACE USING ADDITIVE MANUFACTURING," the disclosure of which is hereby incorporated herein by reference in its entirety.

TECHNICAL FIELD

The embodiments relate to forming an optical element, and in particular to methods of forming an optical element using an additive manufactured component, and related devices, components, and methods.

BACKGROUND

Optical elements, such as lenses and reflective elements, have a variety of applications. For many optical elements, a high degree of precision is required for the optical elements to function correctly. However, manufacturing lenses with this high degree of precision can require expensive and time consuming processes, such as single-point diamond turning to provide molds for injection molding processes. Accordingly, there is a need for mechanisms for generating optical surfaces in an efficient and cost-effective manner.

SUMMARY

Embodiments include a method of forming an optical element using an additive manufactured component, and related devices, components, and systems. In one embodiment, a method comprises printing a mold element comprising at least one mold surface using an additive manufacturing device. The method further comprises providing a plastic sheet over the mold element. The method further comprises vacuum thermoforming the plastic sheet such that at least a first portion of the plastic sheet conforms to the at least one mold surface of the mold element. This vacuum thermoforming of the plastic sheet forms an optical element from at least a second portion of the plastic sheet, which may include all or part of the first portion of the plastic sheet. One advantage of this method is that different optical elements may be quickly and inexpensively fabricated, thereby reducing the cost of development and production of the optical elements.

In one embodiment, a method of forming an optical element is disclosed. The method comprises printing a mold element comprising at least one mold surface using an additive manufacturing device. The method further comprises providing a plastic sheet over the mold element. The method further comprises vacuum thermoforming the plastic sheet such that at least a first portion of the plastic sheet conforms to the at least one mold surface of the mold element to form an optical element from at least a second portion of the plastic sheet.

In another embodiment, a method of forming a mold element for vacuum thermoforming an optical element is disclosed. The method comprises printing a mold element comprising at least one mold surface using an additive manufacturing device. The method further comprises processing the mold element to smooth at least one mold surface of the mold element such that a plastic sheet can be vacuum thermoformed with respect to the mold element to form an optical element.

In another embodiment, a mold element for vacuum thermoforming a thermal plastic sheet to form an optical element is disclosed. The mold element comprises a 3D-printed structure having at least one mold surface conforming to a determined optical element.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first surface" and "second surface," and does not imply a priority, a type, an importance, or other attribute, unless otherwise stated herein.

Embodiments include a method of forming an optical element using an additive manufactured component, and related devices, components, and systems. In one embodiment, a method comprises printing a mold element comprising at least one mold surface using an additive manufacturing device. The method further comprises providing a plastic sheet over the mold element. The method further comprises vacuum thermoforming the plastic sheet such that at least a first portion of the plastic sheet conforms to the at least one mold surface of the mold element. This vacuum thermoforming of the plastic sheet forms an optical element from at least a second portion of the plastic sheet, which may include all or part of the first portion of the plastic sheet. One advantage of this method is that different optical elements may be quickly and inexpensively fabricated, thereby reducing the cost of development and production of the optical elements.

Figure 1A:
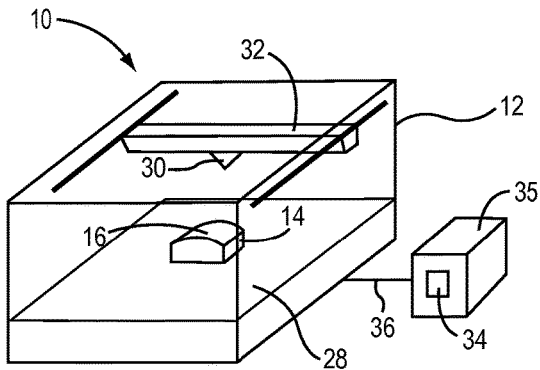
FIGS. 1A-1E illustrate an exemplary process for forming an optical element using vacuum thermoforming and a 3D-printed mold element.

In this regard, FIGS. 1A-1E illustrate an exemplary process 10 for forming an optical element. FIG. 2 provides a flowchart 100 describing the steps of the exemplary process 10 of FIGS. 1A-1E. Referring now to FIG. 1A, an additive manufacturing device 12, such as, for example, a three-dimensional (3D) printer, is used to print a mold element 14 having a mold surface 16 (see Block 102 of FIG. 2). The mold surface 16 may be further processed, for example to smooth the mold surface 16, so that the mold surface 16 is suitable for forming an optical surface.

Figure 1B:
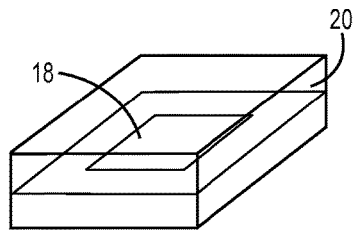
Figure 1C:
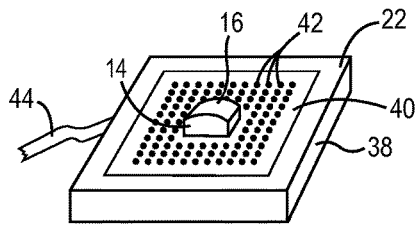
Figure 1D:
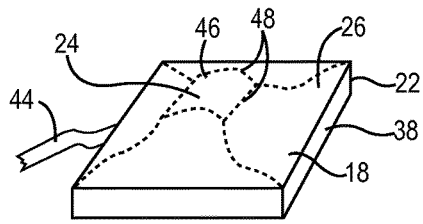
Figure 1E:
Figure 2:
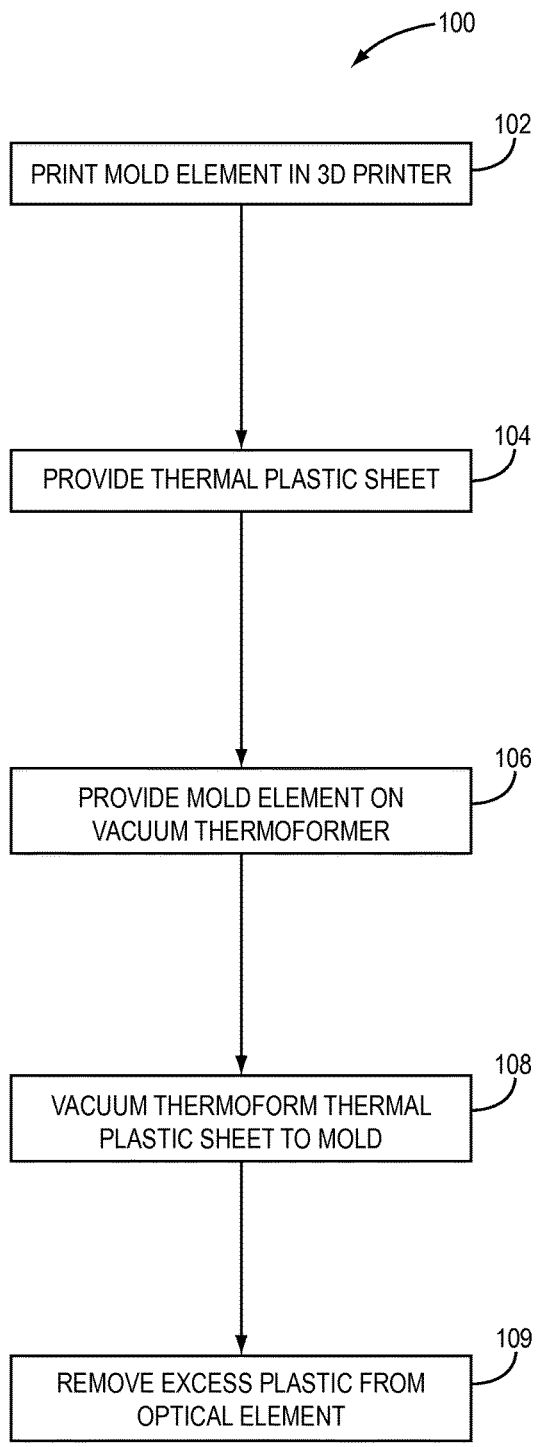
FIG. 2 illustrates a flowchart describing the steps of the process illustrated in FIGS. 1A-1E.

Next, as shown by FIG. 1B, a thermal plastic sheet 18 is provided (see Block 104 of FIG. 2). In this embodiment, the thermal plastic sheet 18 is pre-heated in an oven 20 or other heating device, so that it may better conform to the mold element 14. Referring now to FIG. 1C, the mold element 14 is disposed on a vacuum thermoformer 22 (see Block 106 of FIG. 2). As shown in FIG. 1D, the heated thermal plastic sheet 18 is disposed over the mold element 14 on the vacuum thermoformer 22 such that a portion of the thermal plastic sheet 18 covers the mold surface 16 of the mold element 14. In some embodiments, the vacuum thermoformer 22 may have built-in heating coils or other heating elements capable of heating the thermal plastic sheet 18, thereby eliminating the need for the oven 20. The thermal plastic sheet 18 is now vacuum thermoformed (see Block 108 of FIG. 2) such that a portion of the thermal plastic sheet 18 conforms to the mold surface 16 of the mold element 14 to form an optical element 24. The optical element can then be separated from excess portions 26 of the thermal plastic sheet 18. The optical element 24 is then removed from the mold surface 16 of the mold element 14, as shown in FIG. 1E.

One advantage of this method is that different optical elements, including complex elements having one or more non-rotationally symmetric surfaces, may be quickly and inexpensively fabricated, thereby reducing the cost of development and production of the optical elements. Examples of non-rotationally symmetric surfaces are disclosed in U.S. Pat. No. 8,781,794, the contents of which are incorporated by reference herein for this purpose. For example, one existing technique for forming optical molds is single-point diamond turning, which is time-consuming and expensive compared to the process 10 of FIGS. 1A-1E. Other techniques, such as directly 3D-printing the optical element itself, result in inferior end products that are not suitable for use as optical elements, because the resolutions of existing 3D printers are not fine or precise enough to generate suitable optical elements. The disclosed embodiments are particularly well suited to being used in the design and prototyping phase, where less precision is required for the printed mold or the optical element. In some embodiments, the optical element produced by this method does not need to be precise enough for production, but the precision may nevertheless be sufficient to test the functionality of an optical element. In this manner, the optical element can be rapidly prototyped before transitioning to more expensive and time consuming methods, such as diamond point turning, in the production phase.

In addition, materials used for 3D printing are generally opaque or translucent, and it is difficult to directly form elements having optical quality transparency using a 3D printer. Here, however, by 3D-printing the mold element 14 quickly and inexpensively, the mold surface 16 of the mold element 14 can be made suitable for forming the optical element 24 with minimal post-processing. For example, in this embodiment, the mold surface 16 of the mold element 14 may be sanded, either manually or automatically, after the mold element 14 is printed.

Referring now to FIG. 1A in detail, the additive manufacturing device 12 may include a base 28, on which the mold element 14 is formed, and a movable print head 30 configured to deposit material, such as plastic, metal, ceramic, or other suitable material progressively to form the mold element 14. It should be understood, however, that other types of additive manufacturing technologies may be used. The movable print head 30 may be mounted to a movable print head assembly 32, which is capable of selectively positioning the movable print head 30 in three dimensional space over the base 28. The additive manufacturing device 12 may be controlled by a controller 34, which may be included in an external computing device 35, such as a personal computer running specialized software for example, in this embodiment. The controller 34 communicates with the additive manufacturing device 12 via a data connection 36 between the computing device 35 and the additive manufacturing device 12 in this embodiment. The data connection 36 may be a wired or wireless connection. It should be understood, however, that the controller 34 may also be an internal component of the additive manufacturing device 12. In this embodiment, the controller 34 determines a plurality of point cloud data, for example from a data file. The data file may be in any desired format that is suitable for the additive manufacturing device 12, such as Initial Graphics Exchange Specification (IGES) or the like. The controller 34 interprets the point cloud data and associates the point cloud data with a sequence of 3D positions over the base 28, and sequentially positions the movable print head 30 using the movable print head assembly 32 to deposit printing material as three-dimensional "pixels" to form the printed three-dimensional element, in this embodiment, the mold element 14. The point cloud data is particularly suitable for generating a non-rotationally symmetric optical surface, for example. As discussed above, the mold surface 16 may still require smoothing and polishing before it is suitable for molding the optical element 24, but it is contemplated that 3D-printing resolution will improve to the point that such post-processing may be unnecessary.

Referring again to FIG. 1B, the heated plastic sheet 18 may be a material that is transmissive to light, for forming a lens for example. In another embodiment, the heated plastic sheet 18 may include a reflective metallic coating, for forming a mirror or other reflective element.

Referring again to FIG. 1C, the vacuum thermoformer 22 may include a base 38 having a vacuum surface 40 containing a plurality of vacuum holes 42. When the heated thermal plastic sheet 18 is disposed over the mold element 14, portions of the thermal plastic sheet 18 around the mold elements 14 cover the vacuum holes 42. When suction is applied, for example, via vacuum line 44, the excess air between the thermal plastic sheet 18 and base 38 is evacuated through the vacuum holes 42 by suction, thereby causing the thermal plastic sheet 18 to conform to the mold element 14 and form the optical element 24.

Referring again to FIG. 1D, a detailed view of the finished optical element 24 is illustrated. In this embodiment, the optical element 24 is a transparent lens that can be used in head gear, such as, by way of non-limiting example, headwearable display devices that have an ultra-wide field of view (UWFOV), such as fields of view (FOVs) greater than 100 degrees for each eye. In this embodiment, the lens has a convex outer surface 46 corresponding to the surface of the thermal plastic sheet 18 facing away from the mold element 14, and edges 48 corresponding to cut lines between the optical element 24 and the excess portions 26 of the thermal plastic sheet 18.

Figure 3:
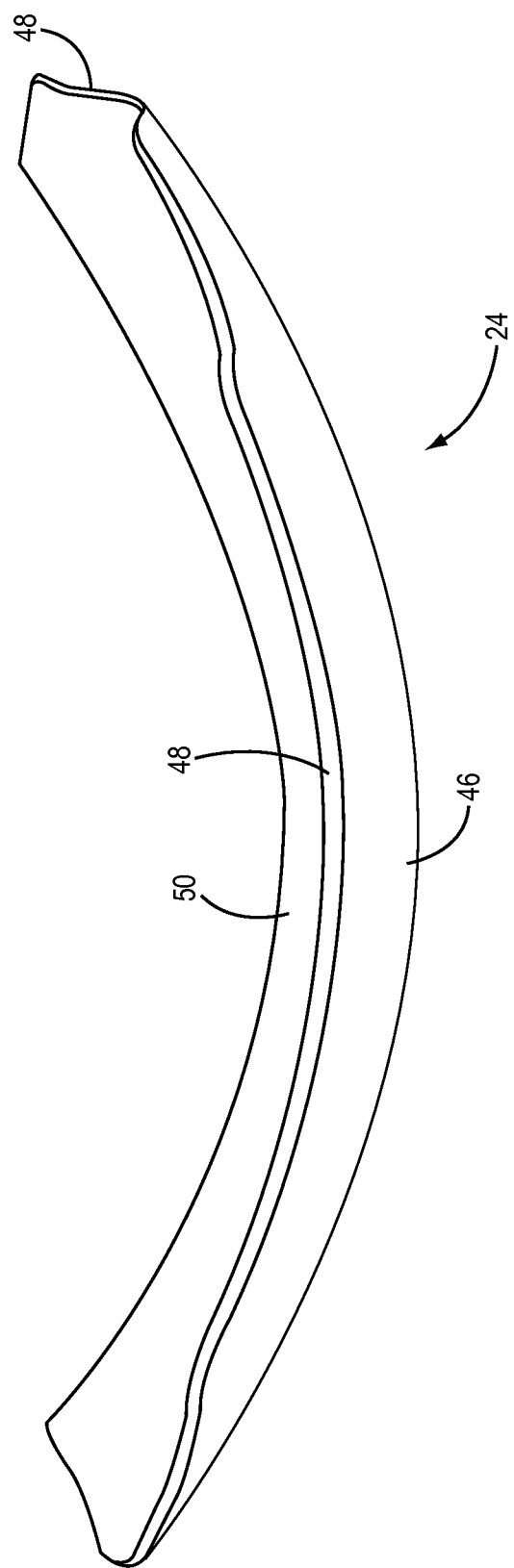
FIG. 3 illustrates a detailed view of an optical element formed by the process of FIGS. 1A-1E.

In this regard, FIG. 3 illustrates a detailed view of the finished optical element 24. As shown by FIG. 3, the optical element has a concave inner surface 50 corresponding to the surface of the thermal plastic sheet 18 contacting the mold surface 16 of the mold element 14 during the vacuum thermoforming portion of the process 10.

Figure 4:
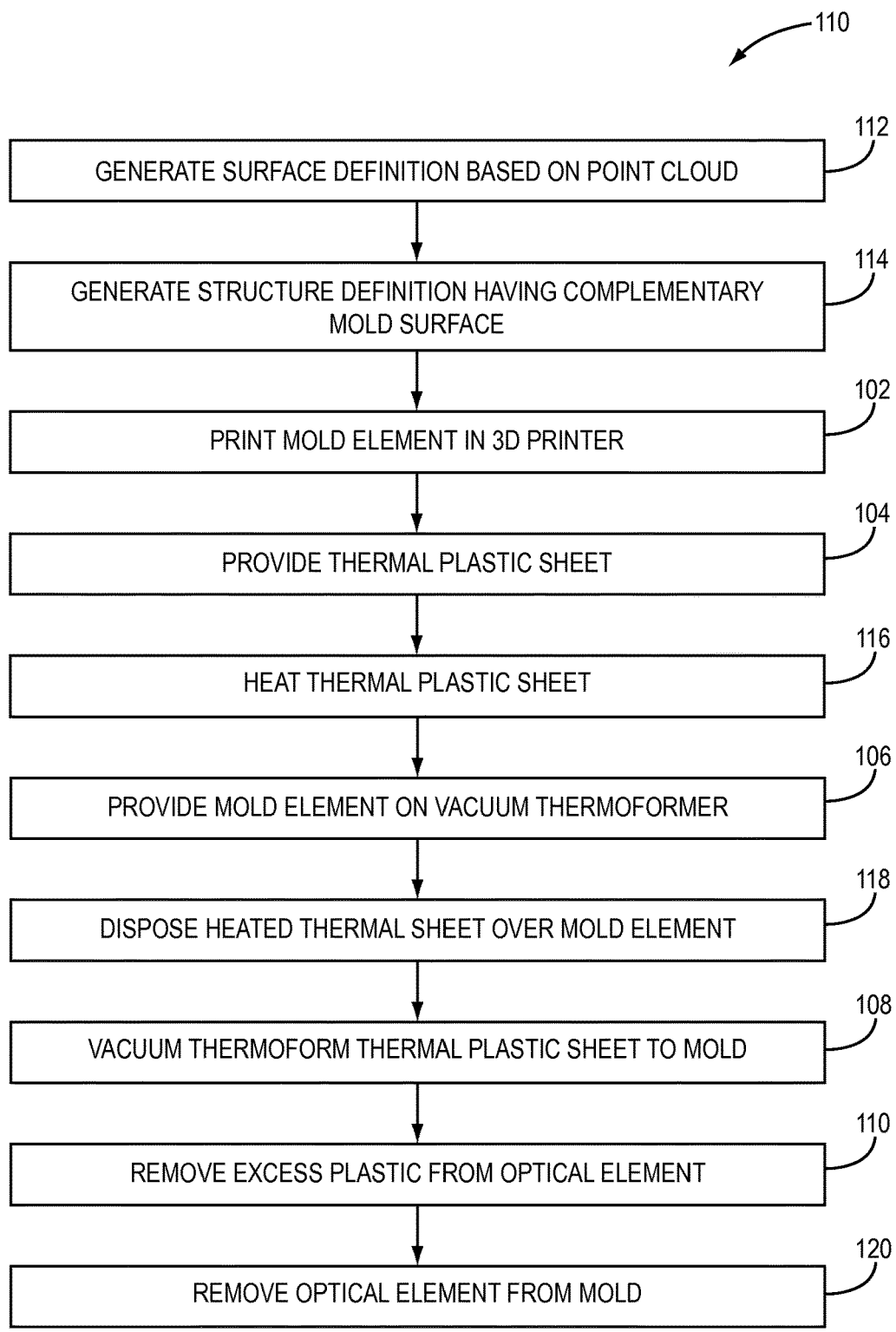
FIG. 4 illustrates a flowchart describing the steps of an alternative process for forming an optical element using vacuum thermoforming and a 3D-printed mold element having additional process steps.

It should be understood that steps may be added, removed, or combined in this and other embodiments. In this regard, FIG. 4 illustrates a flowchart 110 describing the steps of an alternative process according to an embodiment. In the alternative process, a surface definition for a smooth optical surface definition is generated in software or hardware based on, for example, a plurality of point cloud data identifying a lens surface in terms of X, Y, and Z coordinates in a 3D space (block 112). In one embodiment, one or more non-uniform rational B-spline algorithms may be utilized to generate the smoothed optical surface. Next, a structure definition for a mold element having a complementary mold surface to the smooth optical surface and a depth dimension is generated based on the smooth optical surface (block 114). In one embodiment, if the mold surface is concave, the surface prescription may be recalculated to adjust for the thickness of the plastic. In one embodiment, the thickness of the thermal plastic sheet is subtracted from the mold surface, so that the resulting concave reflector in the thermoformed plastic has the right optical properties, such as radius of curvatures. As discussed above, these steps may be performed by the controller 34 of FIG. 1A via software or firmware, for example.

Next, a 3D printer prints the mold element according to the structure definition (block 102). A thermal plastic sheet is provided (block 104), and the sheet is heated (block 116), for example, by using the oven 20 of FIG. 1B. The mold element is provided on a vacuum thermoformer (block 106), and the heated thermal sheet is disposed over the mold element on the vacuum thermoformer (block 118). The thermal plastic sheet is then vacuum thermoformed to conform to the mold (block 108). The excess plastic is then removed from the optical element (block 109) and the optical element is removed from the mold (120). In one embodiment, one or more coatings may then be applied to the lens, such as, for example, via vacuum electrodeposition.

Figure 5:
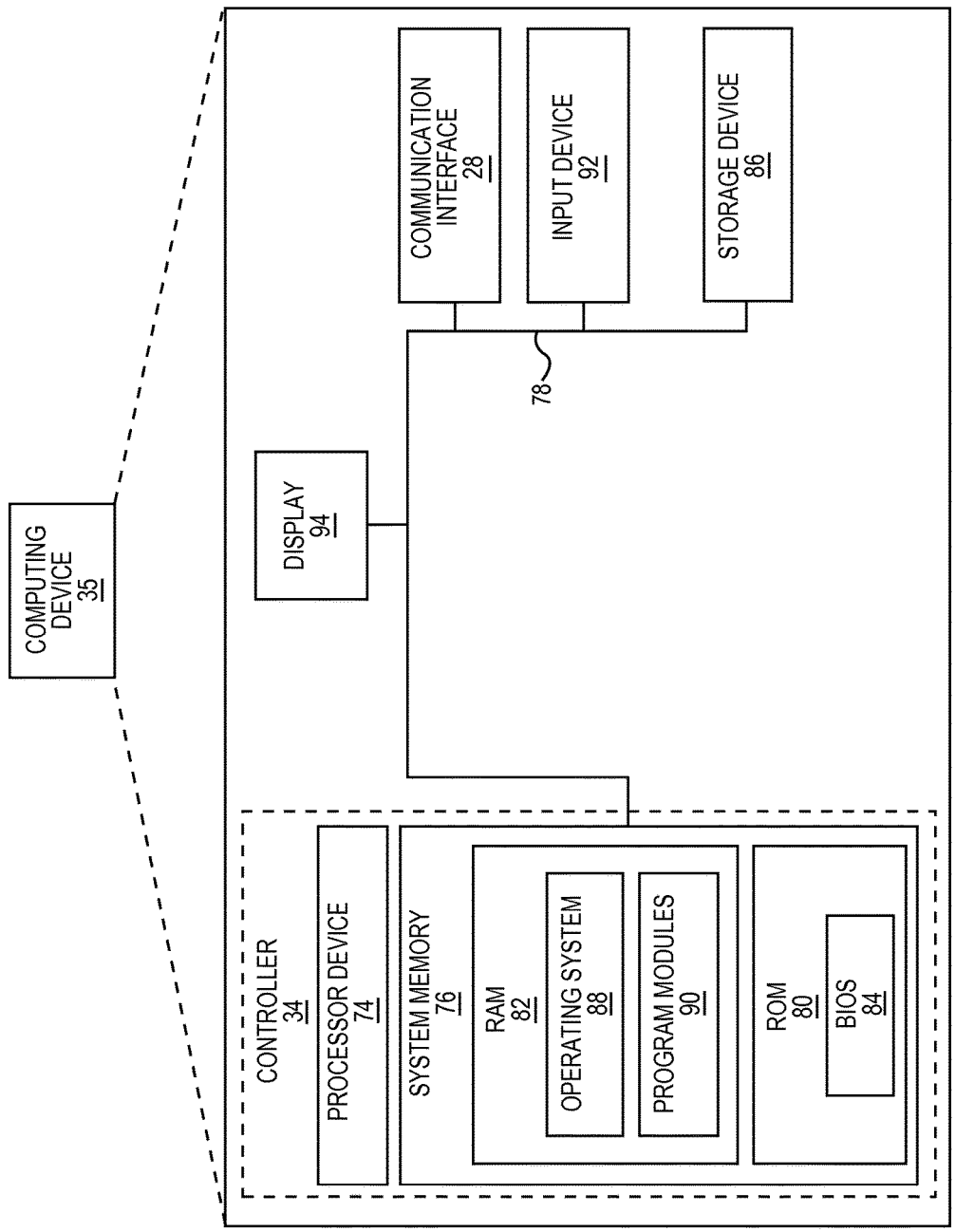
FIG. 5 illustrates a block diagram of a controller for operating the additive manufacturing device of FIG. 1A, according to one embodiment.

As discussed above, the controller 34 may be an internal component of the additive manufacturing device 12, or may be part of an external computing device 35, as in FIG. 1A. In this regard, FIG. 5 is a block diagram of a computing device 35 according to the embodiment of FIG. 1A. It should be understood, however, that the components of FIG. 5 may be used with other embodiments herein as well. The computing device 35 may comprise any computing or processing device capable of including firmware, hardware, and/or executing software instructions to implement the functionality described herein, and which is capable of being incorporated into components of the controller 34, including, for example, the additive manufacturing device 12 (not shown). In this example, the controller 34 of FIG. 5 includes a processor device 74, a system memory 76, and a system bus 78. The system bus 78 provides an interface for system components including, but not limited to, the system memory 76 and the processor device 74 (not shown). The processor device 74 can be any commercially available or proprietary processor.

The system bus 78 may be any of several types of bus structures that may further interconnect to a memory bus (with or without a memory controller), a peripheral bus, and/or a local bus using any of a variety of commercially available bus architectures. The system memory 76 may include non-volatile memory 80 (e.g., read only memory (ROM)), erasable programmable read-only memory (EPROM), electrically erasable programmable read-only memory (EEPROM), etc., and/or volatile memory 82 (e.g., random-access memory (RAM)). A basic input/output system (BIOS) 84 may be stored in the non-volatile memory 80 and can include the basic routines that help to transfer the information between the elements within the controller 34.

The controller 34 may further include a computer-readable storage device 86, which may comprise, for example, internal solid state memory, or the like. The computer-readable storage device 86 may provide non-volatile storage of the data, the data structures, the computer-executable instructions, and the like.

A number of modules can be stored in the computer-readable storage device 86 and/or in the volatile memory 82, including an operating system 88 and one or more program modules 90, which may implement the functionality described herein in whole or in part, such as, for example, determining and storing the optical surface and mold element structure determined from the point cloud data.

In addition, the controller 34 may include additional components, such as one or more input devices 92, and a display 94 or other visual indicator interface. The components of the controller 34 may interact with other components outside of the controller 34, such as the additive manufacturing device 12 or an external network (not shown), via a communications interface 96.

Those skilled in the art will recognize improvements and modifications to the preferred embodiments of the disclosure. All such improvements and modifications are considered within the scope of the concepts disclosed herein and the claims that follow.

What is claimed is:

1. A method of forming an optical lens, the method comprising:
    printing a mold element comprising at least one mold surface using an additive manufacturing device, the at least one mold surface including at least one non-rotationally symmetric surface;
    providing a plastic sheet over the mold element;
    vacuum thermoforming the plastic sheet to form an optical lens such that at least a first portion of the plastic sheet conforms to the at least one mold surface of the mold element to form at least one non-rotationally symmetric optical surface of the optical lens from at least a second portion of the plastic sheet, the optical lens configured for use with a display device.

2. The method of claim 1, wherein the additive manufacturing device is a three-dimensional (3D) printer.

3. The method of claim 1, wherein the at least one mold surface comprises at least one convex surface, such that the optical lens has at least one concave surface conforming to at least a portion of the at least one convex surface of the mold element.

4. The method of claim 1, wherein the at least one mold surface comprises at least one concave surface, such that the optical lens has at least one convex surface conforming to at least a portion of the at least one concave surface of the mold element.

5. The method of claim 1, further comprising processing the mold element to smooth the at least one mold surface of the mold element prior to providing the plastic sheet over the mold element.

6. The method of claim 5, wherein processing the mold element comprises sanding the at least one mold surface of the mold element.

7. The method of claim 1, wherein the plastic sheet is substantially transmissive to light, such that the optical lens is a transmissive optical lens.

8. The method of claim 1, further comprising removing an excess portion of the plastic sheet from the optical lens.

9. The method of claim 8, further comprising removing the optical lens from the mold element.

10. The method of claim 1, further comprising removing the optical lens from the mold element.

11. The method of claim 1, further comprising heating the plastic sheet prior to providing the plastic sheet over the mold element.

12. The method of claim 11, wherein heating the plastic sheet comprises disposing the plastic sheet in an oven for a predetermined period.

13. The method of claim 1, further comprising:
disposing the mold element on a vacuum thermoforming surface of a vacuum thermoforming device prior to providing the plastic sheet over the mold element; and
vacuum thermoforming the plastic sheet comprises activating the vacuum thermoforming surface such that gas is evacuated from between the mold element and the plastic sheet such that at least the first portion of the plastic sheet conforms to the at least one mold surface of the mold element to form the optical lens.

14. The method of claim 1, further comprising:
generating an optical lens surface definition for an optical lens based on a plurality of point cloud data identifying an optical lens surface in three dimensional coordinates; and
generating at least one mold surface definition based on the plurality of point cloud data and complementary to the optical lens surface definition, wherein printing the mold element is based on the at least one mold surface definition.

15. The method of claim 14, further comprising generating at least one mold structure definition based on the at least one mold surface definition, wherein printing the mold element is based on the at least one mold structure definition.

16. The method of claim 1, further comprising placing the mold element over a vacuum surface of the vacuum thermoformer, the mold element having a smaller footprint than the vacuum surface.

17. A method of forming a mold element for vacuum thermoforming an optical lens, the method comprising:
generating an optical lens surface definition for an optical lens based on a plurality of point cloud data identifying an optical lens surface in three dimensional coordinates;
generating at least one mold surface definition based on and complementary to the optical lens surface definition;
printing a mold element comprising at least one mold surface based on the at least one mold surface definition using an additive manufacturing device, the at least one mold surface including at least one non-rotationally symmetric surface; and
processing the mold element to smooth the at least one mold surface of the mold element such that a plastic sheet can be vacuum thermoformed with respect to the mold element to form at least one non-rotationally symmetric optical surface of the optical lens, the optical lens configured for use with a display device.

18. The method of claim 17, further comprising generating at least one mold structure definition based on the at least one mold surface definition, wherein printing the mold element is based on the at least one mold structure definition.

* * * * *